US005161630A

United States Patent [19]

Garin, III et al.

[11] Patent Number: 5,161,630

[45] Date of Patent: Nov. 10, 1992

[54] WHEELCHAIR DRIVE ASSEMBLY

[75] Inventors: Paul V. Garin, III, Clovis; Donald E. Lusk, Fresno, both of Calif.

[73] Assignee: Fortress Lite-Style, Inc., Clovis, Calif.

[21] Appl. No.: 578,587

[22] Filed: Sep. 4, 1990

[51] Int. Cl.[5] .................................................. B60K 1/00

[52] U.S. Cl. .................................. 180/65.2; 180/65.1; 180/907; 192/67 P; 280/250.1

[58] Field of Search ............... 180/6.5, 907, 247, 65.1, 180/65.5, 65.2; 280/250.1, 304.1; 192/67 P; 403/1

[56] References Cited

U.S. PATENT DOCUMENTS

| | | | |
|---|---|---|---|
| 2,635,703 | 4/1953 | Goeller | 180/907 X |
| 3,889,773 | 6/1975 | Chant | 180/907 X |
| 4,504,094 | 3/1985 | Burrows | 192/67 P X |
| 4,512,613 | 4/1985 | Nassiri | 180/907 X |
| 4,805,712 | 2/1989 | Singleton | 280/250.1 X |

FOREIGN PATENT DOCUMENTS

| | | | |
|---|---|---|---|
| 2102360 | 2/1983 | United Kingdom | 180/907 |
| 2192161 | 1/1988 | United Kingdom | 180/65.1 |

*Primary Examiner*—Eric D. Culbreth

*Attorney, Agent, or Firm*—Reed, Smith, Shaw & McClay

[57] ABSTRACT

A motorized wheelchair rear wheel drive assembly is selectively engageable and disengageable by an occupant to permit the wheelchair to be used in either a motorized mode or an occupant self propelled mode. For each rear wheel a drive motor connects through an axially extending worm gear assembly and rear drive axle to a drive hub. The drive hub is positioned outside of the rear wheel and supports a control handle which in turn controls a pair of locking pins which selectively engage the drive hub or disengage the drive hub from the rear wheel. The drive assembly enables the wheelchair to be folded to a laterally more compact condition.

11 Claims, 3 Drawing Sheets

WHEELCHAIR DRIVE ASSEMBLY

CROSS-REFERENCE TO RELATED APPLICATION

This application is being simultaneously filed with a commonly assigned application Ser. No. 07/579,156 for "FOLDABLE WHEELCHAIR WITH OPTIONAL POWER OR MANUAL DRIVE".

BACKGROUND OF THE INVENTION

Substantial strides have been made in recent years to develop wheelchairs that can provide handicapped persons with greater mobility. Battery powered, motorized wheelchairs have greatly increased the speed and distance which a person can travel without assistance from others.

However, motorized wheelchairs tend to be bulkier than nonmotorized wheelchairs and are not built to provide optional manual self propulsion by the occupant. The rear drive wheels are usually smaller than the rear wheels of a nonmotorized wheelchair and are usually mounted farther rearward than the wheels of a nonmotorized wheelchair. In a typical model in which heavy batteries are located at the rear of the chair, the central axis of the rear wheels must be moved behind the wheelchair seat back to preclude tipping of the wheelchair.

Furthermore, the wheelchair occupant cannot readily disconnect the rear wheels from the drive motors. These drive motors have considerable inertia and make manual propulsion of the wheelchair difficult while they are connected. The small size and rearward positioning of the rear wheels further adds to the difficulty of self propulsion. Typically a manual drive ring is not even provided on the rear wheels of a motorized wheelchair. It would be desirable to have a motorized wheelchair which the occupant could selectively disconnect from the motor drive system and manually self propel in situations where precise maneuvering is required, or some exercise for the user is desirable.

SUMMARY OF THE INVENTION

A manually releasable wheelchair hub drive assembly in accordance with the invention enables the occupant of a motorized wheelchair to manually connect and disconnect the rear wheels and the rear wheel drive motors. The center of rotation of the rear wheels is placed behind, at or ahead of the wheelchair seat back and full size 24 inch wheels are provided for the wheelchair. A manual drive ring is provided on the outside of each rear wheel to enable the occupant to disconnect the drive motors and manually self propel the wheelchair at will. The hub drive assembly does not interfere with folding of the wheelchair to a laterally more compact condition for storage or travel.

A substantially identical hub drive assembly is provided for each rear wheel. Each hub drive assembly includes an electric drive motor, a laterally extending worm gear assembly coupled to the drive motor, a rear drive axle having an inner end connected to the worm gear assembly and an opposite outer end, a drive hub fixed to the outer end of the drive axle and a driven hub or spider secured to the rear wheel of the wheelchair at a central hub region. Rotational force is transmitted from the drive motor, through the worm gear assembly and drive axle to the outer drive hub.

The drive hub has a pair of diametrically opposed, axially extending locking pin holes extending therethrough. A pair of locking pins and a pair of helical coil springs are disposed in the locking pin holes. The outer ends of the locking pins terminate in a shank which connects through a pivot pin to opposite sides of a U-shaped handle. The locking pins are eccentrically secured to the handle such that when the handle is rotated to a disengaged position, the locking pins are pulled laterally outward away from engagement with the driven hub.

When the handle is rotated 180 degrees, the locking pins are permitted to move laterally inward under spring tension toward the driven hub. The driven hub has multiple axially extending locking pin holes radially spaced for opposed alignment with the pairs of locking pins. When the driven hub and drive hub rotate into proper relationship, the locking pins become positioned opposite a pair of holes in the driven hub and are forced into engagement by the coil springs. The rear wheel is thus engaged to the drive motor.

Because of the positioning of the rear wheel center of rotation behind, under or in front of the seat back, the use of large 24 inch wheels and the attachment of a manual drive ring to the outside of each rear wheel, an occupant can reach down to the hub region of the rear wheels, toggle the handle to the disengaged position and proceed with manual self propulsion of the wheelchair. The wheelchair is free of the motor drag and inertia and can be controlled as if it were a nonmotorized wheelchair.

Alternatively, the wheelchair occupant can reach down to the rear wheel hub position, toggle the control handle to the engaged position and proceed with motorized operation of the wheelchair. The wheel drive assembly is arranged to allow folding of the wheelchair to a laterally more compact position in a manner similar to a nonmotorized wheelchair. In addition, the control handle preferably has two distinguishable opposite surfaces, such as smooth and rough, to enable the occupant to tell by tactile feel and without looking whether or not the rear wheels are engaged to the drive motors. For example, an outwardly facing rough surface could indicate engagement.

DETAILED DESCRIPTION OF THE PREFERRED EMBODIMENT

Figure 1:
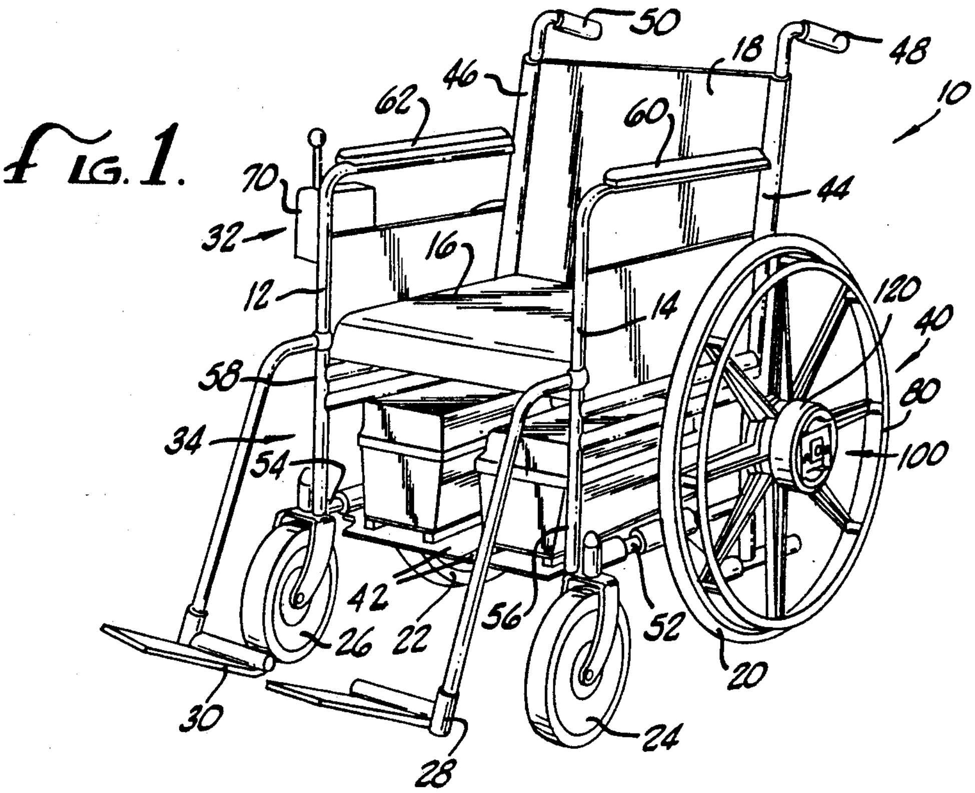
FIG. 1 is a simplified perspective view of a selectively power driven or occupant self propelled wheelchair housing a selectively connectable wheel drive assembly in accordance with a preferred embodiment of the invention.
Figure 2:
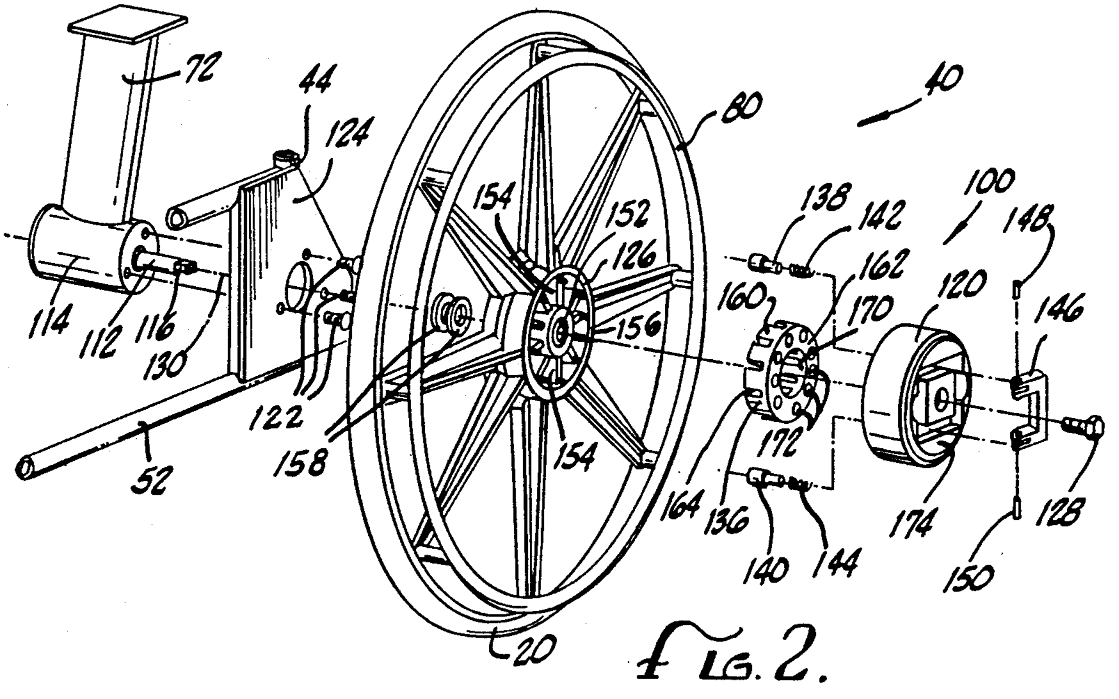
FIG. 2 is an exploded perspective view of the wheel drive assembly in accordance with the invention.

Referring now to FIG. 1, a foldable, selectively power driven or manually self propelled wheelchair 10 in accordance with the invention includes opposed right and left side frames 12, 14 providing the primary structural support for wheelchair 10. A seat 16 having a back support 18 extends between frames 12, 14 to support a wheelchair occupant (not shown). Also supported by the frames 12, 14 are left and right rear wheels 20, 22, left and right castor mounted front wheels 24, 26, left and right foot supports 28, 30, a motor drive system 32 and an energy supply system in the form of a battery support assembly 34. The rear wheels 20, 22 are identically mounted on a frame 10 by a selectively releasable hub drive mechanism or assembly 100 as illustratively shown for rear wheel 20.

The wheelchair side frames 12, 14 are made primarily of strong, lightweight tubing of a metal such as aluminum. The side frames are connected by a foldable supporting structure 42. The side frames 12, 14 include a pair of vertically extending members 44, 46 which support seat back 18 between them and terminate in a pair of rearwardly extending handles 48, 50. The side frames 12, 14 further include longitudinally extending tubular members 52, 54 which support a battery support assembly 34. Front vertical frame members 56, 58 extend upwardly from longitudinal frame members 52, 54 and then bend rearward to provide arm rests 60, 62. The seat 16 is either removable or foldable to allow the wheelchair 10 to be folded to a more laterally compact condition.

Figure 6:
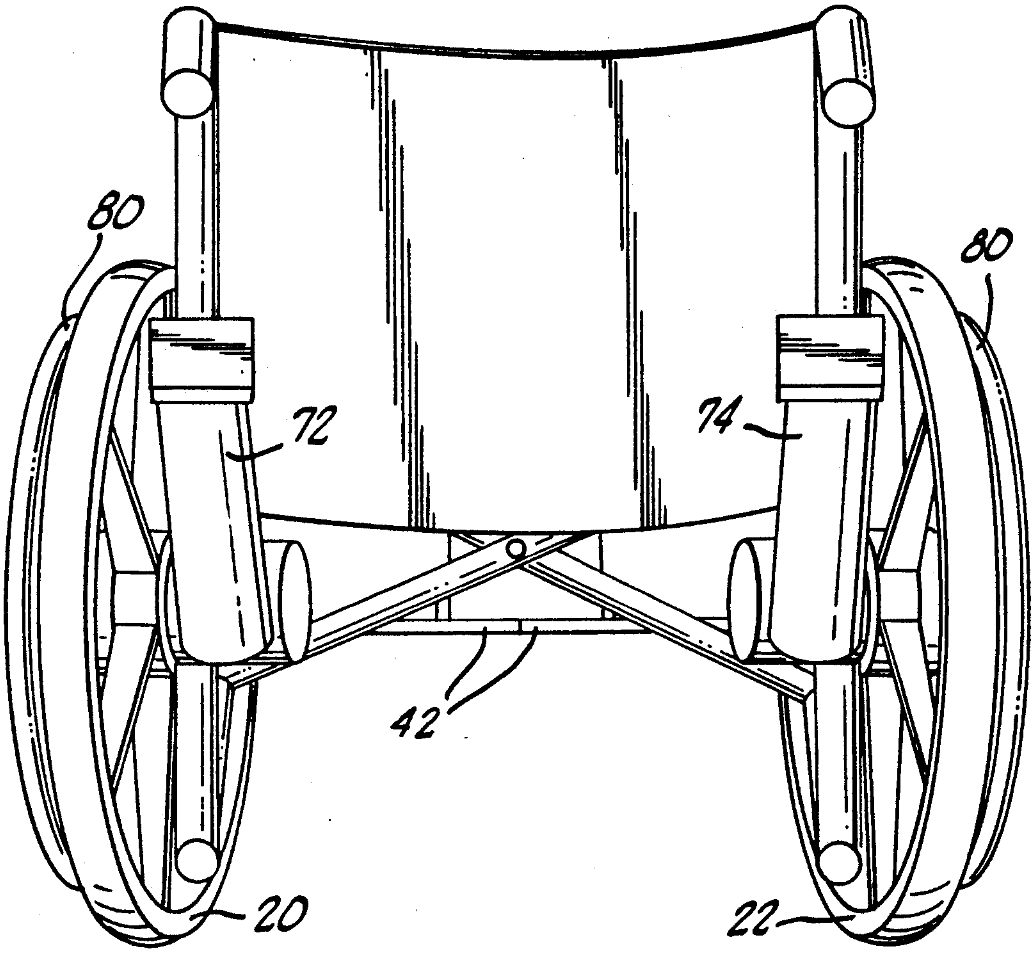
FIG. 6 is a simplified rear perspective view of a power driven wheelchair in accordance with the invention with the battery support assembly removed.

Making reference now to FIGS. 1 and 6, the motor drive system 32 includes a manual joy stick controller 70 receiving energy from the energy supply system 34 and two motors 72, 74 independently driving the rear wheels 20, 22 in response to manipulation of the joy stick controller 70.

The front wheels 24, 26 are castor mounted and have no independent steering capability. They are passively responsive to the steering motion of the wheelchair 10. Steering may thus be completely controlled through the independent motion of rear wheels 20, 22.

Occupant manual propulsion of wheelchair 10 is enabled by providing large, 24 inch diameter rear wheels 20, 22 by providing a center of rotation for wheels 20, 22 at or in front of the seat back support 18, by mounting a manual propulsion or drive ring 80 on the outside of wheels 20, 22 and by coupling the wheels 20, 22 to their respective drive motors 72, 74 through a manually releasable hub assembly 100. When hub assembly 100 is disengaged the associated rear wheels 20, 22 of wheelchair 10 is completely disconnected from drive motors 72, 74.

A separate hub assembly 100 connects each drive motor 72, 74 to its associated rear wheel 20, 22 respectively. Thus, while only the hub assembly 100 coupling motor 72 to rear wheel 20 is illustrated and described in detail, it will be appreciated that a substantially identical hub assembly connects drive motor 74 to rear wheel 22.

Making reference now to FIGS. 2–5*b*, hub assembly 100 includes a drive axle 112 having an inner driven end permanently coupled through an axially extending worm gear assembly 114 to motor 72 which has an axis of rotation extending parallel to drive axle 112. While most of drive axle 112 is cylindrical in shape, an outer, free end 116 of drive axle 112 has a square shape and is received in mating relationship by an axially or laterally extending square aperture 118 (see, for example, FIG. 3) in a generally cylindrical drive hub 120. The square shapes of end 116 and aperture 118 serve as a key to prevent relative rotation between shaft 112 and drive hub 120. A bolt 128 secures drive hub 120 to free end 116 of drive axle 112.

Worm gear assembly 114 and its output shaft 112 carried thereby are mounted by bolts 122 to a metal plate 124 which forms part of side frame 14 and is positioned longitudinally in front of vertical member 44, which supports seat back support 18. Drive axle 112 receives and rotationally supports a central hub 126 of rear wheel 20 laterally on the outer side of side frame 14. The central axis 130 about which wheel 20 (and similarly wheel 22) rotates is thus positioned longitudinally forward of seat back support 18. In this position a wheelchair occupant can conveniently reach the center of wheels 20, 22 to toggle releasable hub assembly 100 between states of engagement and disengagement. The occupant can also conveniently reach the hand rail 80 to manually self propel and guide wheelchair 10.

In addition to drive axle 112 and drive hub 120 the releasable hub assembly 100 includes a spider 136 which engages central hub 126, a pair of locking pins 138, 140, a pair of springs 142, 144, a toggle handle 146, and a pair of pivot pins 148, 150 for pivotally securing handle 146 to the locking pins 138, 140.

Central hub 126 is preferably made of plastic and has a cylindrical center hub 152 that is connected by multiple radial spokes 154 to a cylindrical middle hub 156. Bearings 158 rotationally mount center hub 152 and hence wheel 20 on drive axle 112.

Spider 136 is a generally cup-shaped member having a generally cylindrical sidewall 160 and a disk shaped end wall 162 affixed thereto. Sidewall 160 has multiple axial slots 164 which mate with spokes 154 as spider 136 is slid into engagement with central hub 126. The engagement between spokes 154 and slots 164 precludes relative rotation between spider 136 and central hub 126 of wheel 20.

The end wall 162 of spider 136 has a large central bore 170 which surrounds the center hub 152 and receives drive axle 112 and multiple axially extending, circumferentially spaced, diametrically opposed pairs of locking pin holes 172 distributed at equal radii about central axis 130. Spider 136 is made of metal so that locking pin holes 172 can receive locking pins 138, 140 without sustaining damage that might be inflicted if locking pins 138, 140 were allowed to directly engage the plastic central hub 126.

Drive hub 120 is a generally cylindrical member having a laterally outward facing circular end surface 174 having a rectangular shaped slot or groove 176 defined therein to a depth of about ⅜ inch. A pair of locking pin bores 178, 180 extend axially through drive hub 120 at radial positions matching the radial positions of locking pin holes 172 in spider 136. Bores 178, 180 each have a large diameter section 182 that mates with the large diameter laterally inward locking end 184 of locking pins 138, 140 and a small diameter section 186 that guides a small diameter shank portion 188 of locking pins 138, 140. The springs 142, 144 are inserted in the bores 180, 178 ahead of locking pins 138, 140 and thus tend to force locking pins 138, 140 laterally inward toward spider 136.

Handle 146 is a generally U-shaped member having a cross bar 194 with two side bars 196, 198 depending therefrom in parallel opposed relationship. The side bars 196, 198 terminate in ends 200, 202 having slots 204, 206 adapted to receive the outward ends of shank portions 188 of respective locking pins 138, 140.

A pair of transverse bores 210, 212 pass through the ends 200, 202 of side bars 196, 198 in a direction parallel to cross bar 194. Handle 146 has first and second opposed parallel planar side surfaces 216, 218. Bores 210, 212 are located eccentrically with respect to these side surfaces 216, 218 and also with respect to ends 200, 202 to enable the axial positioning of locking pins 138, 140.

The shanks 188 of locking pins 138, 140 are sufficiently long relative to the depth of large diameter section 182 of bores 178, 180 and the thickness of drive hub 120 that they may be forced laterally outward to a position wherein transverse pivot pin bores 222, 224 located near the ends thereof extend beyond the outer surface of drive hub 120. From this position the ends 200, 202 of handle 146 can be joined with the shank ends of locking pins 138, 140 with the ends being received into slots 204, 206 such that bores 222, 224 may be axially aligned with the bores 210, 212 in handle 146. With the bores thus aligned pivot pin 148 may be inserted into bores 222 and 210 to pivotally attach locking pin 138 to handle side member 196 and pivot pin 150 may be inserted into bores 224 and 212 to pivotally attach locking pin 140 to hand side member 198. With the locking pins 138, 140 thus attached to handle 146 they may be released to allow springs 142, 144 to force handle ends 200, 202 axially inwardly into rectangular groove 176. The sidewalls of groove 176 then serve to restrain pivot pins 148, 150 to maintain the assembled arrangement.

The bores 210, 212 are eccentrically located closer to second surface 218 than first surface 216 and closer to first surface 216 than to ends 200, 202. Handle 146 may thus be toggled by rotation between two stable positions 180 degrees apart. The two surfaces 216, 218 are made tactilely distinguishable by roughening surface 216 at area 228, by defining letters in one of the surfaces or by means of some other technique which allows a wheelchair occupant to determine the toggle state of handle 146 simply by touching the handle surface and without visual inspection. The occupant may thus be able to readily determine whether or not the rear wheel hubs are engaged or disengaged.

Figure 3:
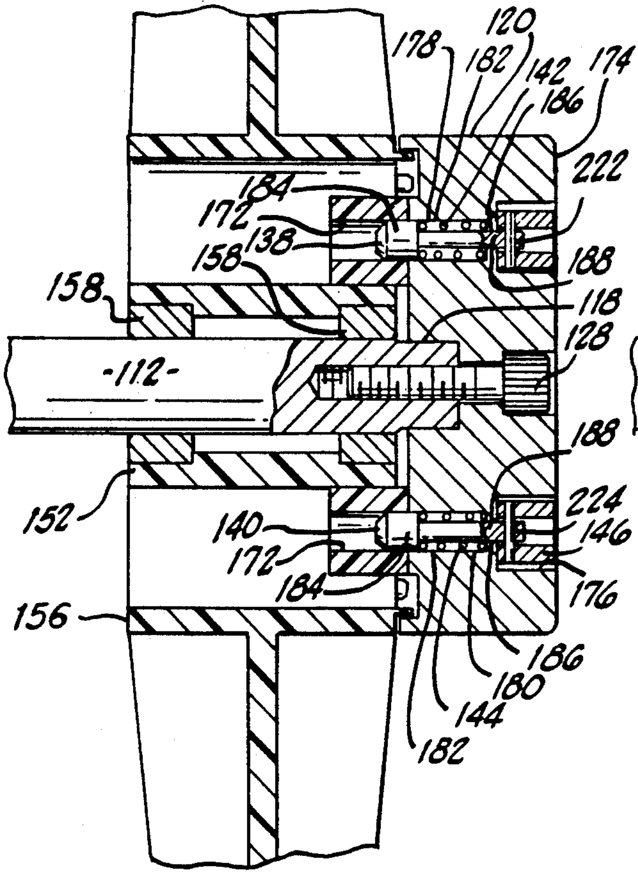
FIG. 3 is a cross sectional view of the wheel drive assembly shown in FIG. 2 with locking pins in an engaged position.

When handle 146 is rotated to the position wherein first surface 216 faces outward as shown in FIG. 3, the locking pins 138, 140 are released so as to be forced by springs 142, 144 toward the spider 136. When the wheels are rotated so that the pins 138, 140 become aligned with a pair of locking pin bores 172 the pins move axially inward to enter the bore 172 and rotationally lock the rear wheel 20 or 22 to drive hub 120 and hence to drive system 32. In this position the occupant can feel the roughened area 228 to confirm the engaged condition.

Figure 4:
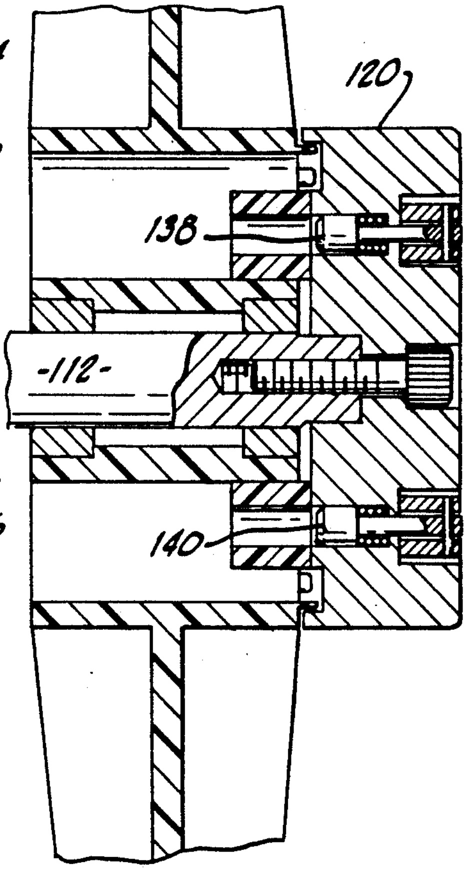
FIG. 4 is a cross sectional view of the wheel drive assembly shown in FIG. 2 with locking pins in a disengaged position.
Figure 5A:
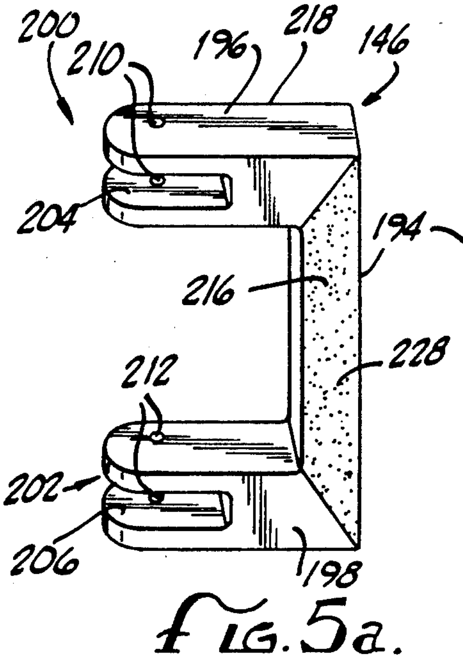
FIG. 5*a* is a front perspective view of a U-shaped toggle handle used in the wheel drive assembly shown in FIG. 2.
Figure 5B:
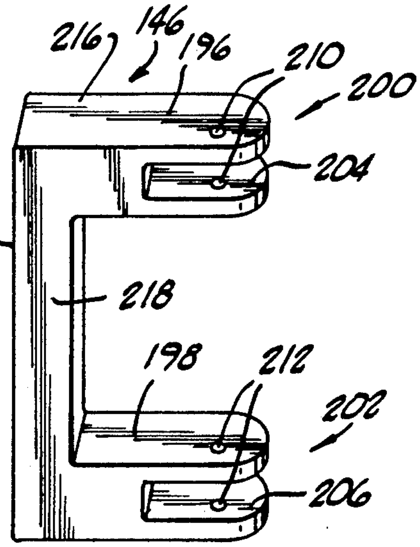
FIG. 5*b* is a rear perspective view of a U-shaped toggle handle used in the releasable wheel drive assembly shown in FIG. 2.

When handle 146 is toggled 180 degrees to the disengaged condition as shown in FIG. 4, the locking pins 138, 140 are lifted from the bores 172 in spider 136 to allow rear wheel 20 to turn freely relative to drive hub 120. In this position, the wheel chair occupant can feel the smooth side 218 of handle 146. Wheelchair 10 can be manually guided and propelled without encountering any drag from the drive motors 72, 74.

While there has been shown and described above a particular arrangement of a motor drive assembly for a foldable, selectively motor driven or self propelled wheelchair in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A selectively connectable wheel drive assembly for a rear wheel of a wheelchair comprising:
- a drive axle having an inner end coupled to a motor and an outer end;
- a wheel rotationally mounted on the drive axle, the wheel having a central hub with at least one axially extending pin hole therein;
- a drive hub secured to the outer end of the drive axle in nonrotating relationship therewith;
- a handle pivotally mounted on the drive hub, the handle being pivotable between different engagement and disengagement positions; and
- a locking pin secured to the drive hub in axially movable relationship therewith, the locking pin being pivotally coupled to the handle such that the locking pin moves axially as the handle pivots between the engaged position wherein the locking pin engages said at least one pin hole in the central hub and the disengaged position wherein the locking pin is positioned axially away from engagement with said at least one pin hole in the central hub.

2. A wheel drive assembly according to claim 1 wherein the wheelchair wheel central hub includes a main hub supporting the wheel on the axle and a spider that is slidingly received on the axle and rotationally locked to the main hub between the main hub and the drive hub, the at least one axially extending pin hole being provided in the spider.

3. A wheel drive assembly according to claim 2 wherein the main hub has multiple axially extending protrusions and the spider has multiple axially extending slots which mate with the main hub protrusions to rotationally lock the spider to the main hub.

4. A wheel drive assembly according to claim 3 wherein the main hub comprises plastic and the spider consists entirely of metal.

5. A wheel drive assembly according to claim 1 wherein the handle has a pair of tactilely distinguishable opposed side surfaces that enable an operator to determine a state of engagement of the wheel drive assembly by touching the handle to determine which side surface faces outward.

6. A wheel drive assembly according to claim 1 further comprising a worm gear assembly coupled between a drive motor and the inner end of the drive axle.

7. A wheelchair wheel drive assembly according to claim 1 wherein the at least one axially extending pin hole in the central hub comprises at least one diametrically opposed pair of pin holes and wherein the drive hub has two diametrically opposed pin holes therein which are radially positioned for opposed relationship with each pair of pin holes in the central hub; wherein said locking pin is a first locking pin and wherein said first locking pin and a second locking pin are each disposed within different drive hub pin holes and each having a shank portion with a transverse pivot pin hole extending past the drive hub pin holes; and further comprising a handle having two laterally spaced slots receiving the shank portions of said first and said second locking pins, the handle having a pair of pivot pin holes, one adjacent each slot, which are eccentrically placed such that rotation of the handle about the pivot pin holes axially moves the locking pins between positions of engagement and disengagement; a pair of pivot pins disposed in the pivot pin holes of said first and said second locking pins and said handle and pivotally securing the shank portions of each locking pin to one of said slots in the handle; and a pair of springs, each disposed within a different drive hub pin hole and biasing the locking pin therein toward an engagement position.

8. A wheelchair wheel drive assembly comprising:

a transversely extending drive axle having one end coupled to a drive source and an opposite free end extending outwardly from a wheelchair;

a wheelchair wheel having a cylindrical center hub, a cylindrical bearing disposed within the center hub and a plurality of spokes extending radially outward from the cylindrical center hub, the wheel being rotationally disposed on the drive axle;

a generally cylindrical spider having multiple laterally extending slots, the spider being concentrically disposed about the drive axle adjacent the wheel with the slots receiving the radially extending spokes to rotationally lock the spider to the wheel, the spider having multiple diametrically opposed pairs of axially extending locking pin holes in a laterally outer surface thereof;

a generally cylindrical drive hub secured to the outer end of the drive axle in nonrelative rotating relationship thereto with the spider being disposed between the drive hub and wheel, the drive hub having a pair of axially extending, diametrically opposed locking pin holes therethrough, the locking pin holes having a larger diameter portion adjacent the spider and a smaller diameter portion laterally outward of the larger diameter portion;

a pair of locking pins, each disposed in a different drive hub locking pin hole and each having a larger diameter portion in opposed facing relationship to the spider and a smaller diameter shank portion extending through the smaller diameter portion of the drive hub locking pin hole, each shank portion having a distal end extending beyond the drive hub and a transverse pivot pin hole extending through the shank portion adjacent the distal end;

a pair of springs, each disposed in the larger diameter portion of a different drive hub locking nut hole between a larger end of the locking pin therein and the transition to the smaller diameter portion of the hole and urging the locking pin in the hole axially toward the spider;

a generally U-shaped handle having a pair of spaced apart side bars terminating in slotted ends, each of which receives a distal end of said locking pin shank portion, each side bar having a pivot pin hole adjacent the slotted end thereof which is in communication with the slot, the pivot pin hole being eccentrically located such that the handle has a first stable position with a first side thereof resting flat against the drive hub and a second stable position when pivoted 180 degrees until an opposite second side rests against the drive hub, the eccentricity of the handle pivot pin holes causing the locking pins to be pulled out of contact with the spider when the handle is in the first position and causing the locking pins to move into mating relationship with a pair of locking pin holes in the spider to rotationally lock the drive hub to the spider when the handle is in the second stable position; and a pair of pivot pins, each disposed in the pivot pin holes of each said locking pin and the mating handle side bar to pivotally connect the locking pins and the handle side bar.

9. A wheelchair wheel drive assembly according to claim 8 wherein the handle has a touch sensitive pattern defined on one side surface thereof to enable a person to tell by feeling the side surface in which stable position the handle resides to thereby determine whether the wheel drive assembly is in a state of engagement or a state of disengagement.

10. A selectively connectable wheel drive assembly for a rear wheel of a wheelchair comprising:

a drive axle having an inner end coupled to a motor and an outer end;

a wheelchair wheel rotationally mounted on the drive axle and having a central hub with at least one axially extending pin hole therein which is radially spaced from the drive axle;

a drive hub connected to the drive axle adjacent the outer end thereof in nonrotating relationship to the drive axle, the drive hub having an axially extending pin bore therein radially spaced to provide opposed relationship with the pin hole, the pin bore having a large diameter section on a side adjacent the wheel, a small diameter section on a side opposite the wheel;

a locking pin having a large diameter head portion and a small diameter shank portion, the locking pin being disposed into the drive hub bore with the large diameter portion adjacent the wheel and the small diameter shank portion extending through the small diameter section of the bore, the shank portion having a transverse bore near an end of the shank portion;

a handle rotatably disposed on the outer surface of the drive hub and having an eccentrically positioned transversely extending hole therein; and a coupling pin extending through the transverse holes in the shank portion and the handle such that rotation of the handle axially move the locking pin between an engagement position in which the head of the locking pin enters the pin hole in the central hub to rotationally lock the drive hub to the central hub and a release position in which the locking pin is axially positioned out of engagement with the pin hole in the central hub.

11. A selectively connectable wheel drive assembly for a rear wheel of a wheelchair comprising:

a drive axle extending along a central axis about which said rear wheel rotates and transverse to a longitudinal direction of the wheelchair, the drive axle having opposite inner and outer ends;

a worm gear assembly extending along the central axis and having an input and an output that is drivingly coupled to the inner end of the drive axle;

an electric motor coupled to drive the input of the worm gear assembly;

a wheel rotationally mounted on the drive axle, the wheel having a central hub with at least one axially extending pin hole therein;

a drive hub secured to the outer end of the drive axle in nonrotating relationship therewith;

a handle pivotally mounted on the drive hub, the handle being pivotable between different engagement and disengagement positions; and a locking pin secured to the drive hub in axially movable relationship therewith, the locking pin being coupled to the handle such that the locking pin moves axially as the handle pivots between the engaged position wherein the locking pin engages a pin hole in the central hub and the disengaged position wherein the locking pin is positioned axially away from engagement with a pin hole in the central hub.

* * * * *